United States Patent
Naruse (10) Patent No.: US 10,983,517 B2
(45) Date of Patent: Apr. 20, 2021

(54) VEHICLE CONTROL DEVICE

(71) Applicant: HONDA MOTOR CO., LTD., Tokyo (JP)

(72) Inventor: Tadashi Naruse, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 16/280,502

(22) Filed: Feb. 20, 2019

(65) Prior Publication Data

US 2019/0258250 A1   Aug. 22, 2019

(30) Foreign Application Priority Data

Feb. 22, 2018 (JP) .............................. JP2018-029530

(51) Int. Cl.
| | |
|---|---|
| *B60K 28/10* | (2006.01) |
| *B60W 10/20* | (2006.01) |
| *G05D 1/00* | (2006.01) |
| *B60R 16/023* | (2006.01) |
| *B60W 50/14* | (2020.01) |

(52) U.S. Cl.
CPC ........... *G05D 1/0061* (2013.01); *B60K 28/10* (2013.01); *B60R 16/0231* (2013.01); *B60W 10/20* (2013.01); *B60K 2370/52* (2019.05); *B60W 2050/146* (2013.01)

(58) Field of Classification Search
CPC .. G05D 1/0061; B60K 28/10; B60K 2370/52; B60R 16/0231; B60R 16/027; B60W 10/20; B60W 2050/146; B60W 60/0053; B62D 15/025; B62D 1/286; B62D 1/04
See application file for complete search history.

(56) References Cited

U.S. PATENT DOCUMENTS

2017/0166236 A1   6/2017   Iguchi et al.

FOREIGN PATENT DOCUMENTS

JP            2015-147531 A   8/2015

*Primary Examiner* — Peter D Nolan
*Assistant Examiner* — Ashley L Redhead, Jr.
(74) *Attorney, Agent, or Firm* — Carrier Blackman & Associates, P.C.; Joseph P. Carrier; William D. Blackman (57) ABSTRACT

If a vehicle controller makes a gripping request, a grip determination unit changes a determination level (voltage threshold) of a grip sensor that is positioned in a particular area of a disposed area where a steering wheel is disposed, in a manner that it becomes less easy to determine that the steering wheel is gripped and it becomes easier to determine that the steering wheel is not gripped, compared with a determination level (voltage threshold) of the grip sensor that is positioned in an area other than an area in a particular direction.

7 Claims, 5 Drawing Sheets

VEHICLE CONTROL DEVICE

CROSS-REFERENCE TO RELATED APPLICATION

This application is based upon and claims the benefit of priority from Japanese Patent Application No. 2018-029530 filed on Feb. 22, 2018, the contents of which are incorporated herein by reference.

BACKGROUND OF THE INVENTION

Field of the Invention

The present invention relates to a vehicle control device that makes a transition between a state where a vehicle system performs a driving operation of an own vehicle partially or entirely and a state where a vehicle occupant performs the driving operation of the own vehicle partially or entirely.

Description of the Related Art

A driving assistance vehicle in which a vehicle system performs a part of a driving operation of an own vehicle and an automated driving vehicle in which the vehicle system performs the entire driving operation of the own vehicle have been developed. In the present specification, the driving assistance is regarded as one type of the automated driving, and the driving assistance vehicle is included in the automated driving vehicle. The automated driving vehicle makes a transition between a state where the vehicle system performs the driving operation and a state where a vehicle occupant performs the driving operation.

For example, in the automated driving vehicle (driving assistance vehicle) that assists a steering operation, on the premise that the vehicle occupant grips a steering wheel, the vehicle system performs the steering operation. Moreover, if the automated driving cannot be continued (for example, the own vehicle has approached an end point of an automated driving allowed section, or it is difficult to detect peripheral information), the automated driving vehicle in which the vehicle system performs the entire driving operation requests the vehicle occupant to grip the steering wheel. In such a circumstance, it has been examined that a grip sensor is provided on the steering wheel of the automated driving vehicle and the vehicle system performs a gripping determination on the basis of the detection result from the grip sensor.

Japanese Laid-Open Patent Publication No. 2015-147531 discloses a steering system that is provided with an electrostatic capacitance sensor as the grip sensor at substantially the entire circumference of a rim part of the steering wheel in a circumferential direction, or at the circumference other than a lower part of the rim part.

SUMMARY OF THE INVENTION

In the automated driving where the vehicle occupant does not need to grip the steering wheel, the vehicle occupant may change a sitting posture. Then, a part of the vehicle occupant other than the hand may be in contact with the steering wheel. For example, the abdomen or the thigh of the leg of the vehicle occupant may be in contact with the lower part of the rim part of the steering wheel. In addition, the vehicle occupant may put his leg on an upper part of the rim part.

In such cases, if the vehicle occupant needs to grip the steering wheel, the vehicle system may mistakenly determine that the vehicle occupant grips the steering wheel even though the vehicle occupant does not grip the steering wheel. One way to prevent the wrong determination is to avoid providing the grip sensor to a particular part of the rim part, for example the lower part of the rim part. In such a case, however, it is difficult for the vehicle system to perform the gripping determination if the vehicle occupant grips the particular part of the rim part.

The present invention has been made in view of the above problem, and an object is to provide a vehicle control device that, if a vehicle occupant needs to grip a steering wheel, prevents a wrong determination in which it is determined that the vehicle occupant grips the steering wheel even through the vehicle occupant does not grip the steering wheel.

A vehicle control device according to the present invention includes: a grip sensor provided along a steering wheel and configured to detect a gripped state of the steering wheel by a vehicle occupant; a grip determination unit configured to determine whether the vehicle occupant grips the steering wheel on a basis of a detection result from the grip sensor; and a vehicle controller configured to make a gripping request if a transition from a state where the vehicle occupant in an own vehicle does not need to grip the steering wheel to a state where the vehicle occupant needs to grip the steering wheel is performed, wherein if the vehicle controller makes the gripping request, the grip determination unit is configured to change a determination level of the grip sensor that is positioned in a particular area of a disposed area where the steering wheel is disposed, in a manner that it becomes less easy to determine that the steering wheel is gripped and it becomes easier to determine that the steering wheel is not gripped, compared with a determination level of the grip sensor that is positioned in an area other than the particular area.

In the above structure, when the gripping request is made, the grip determination unit is configured to change the determination level of the grip sensor that is positioned in the particular area, for example an area in a lower direction, of a disposed area where the steering wheel is disposed, in a manner that it becomes less easy to determine that the steering wheel is gripped and it becomes easier to determine that the steering wheel is not gripped, compared with the determination level of the grip sensor that is positioned in the area other than the particular area. Thus, even if the vehicle occupant changes the posture and a part of the vehicle occupant other than the hand is in contact with a lower part of the steering wheel during the automated driving, a wrong determination in which it is determined that the vehicle occupant grips the steering wheel becomes less likely to occur.

In the present invention, the vehicle controller may be configured to control the own vehicle in a first control state where the vehicle occupant needs to grip the steering wheel and a second control state where the vehicle occupant does not need to grip the steering wheel, and make the gripping request when a transition from the second control state to the first control state is performed, and if a travel time of the own vehicle becomes a predetermined time after the determination level is changed, or if a travel distance of the own vehicle becomes a predetermined distance after the determination level is changed, the grip determination unit may be configured to change the determination level of the grip sensor that is positioned in the particular area, in a manner that it becomes easier to determine that the steering wheel is gripped and it becomes less easy to determine that the steering wheel is not gripped.

In the above structure, the determination level of the grip sensor that is positioned in the particular area is further changed. Thus, in the first control state, the gripping determination of the vehicle occupant can be performed correctly.

In the present invention, if the travel time of the own vehicle becomes the predetermined time after the determination level is changed, or if the travel distance of the own vehicle becomes the predetermined distance after the determination level is changed, the grip determination unit may be configured to equalize the determination level of the grip sensor that is positioned in the particular area, with the determination level of the grip sensor that is positioned in the area other than the particular area.

In the above structure, the determination level of the grip sensor that is positioned in the particular area and the determination level of the grip sensor that is positioned in the area other than the particular area are equalized. Thus, the determination levels become uniform. Therefore, the determination result does not change depending on a gripping position of the vehicle occupant.

In the present invention, the own vehicle may be configured to make a transition between an automated driving state where the vehicle controller performs a steering operation and a normal driving state where the vehicle occupant performs the steering operation, and the vehicle control device may further include a learning unit configured to learn a position of the particular area, or the determination level of the grip sensor during the automated driving.

In the above structure, by the learning, the area or the determination level that suits the vehicle occupant can be set. Thus, the gripping determination can be performed more accurately.

In the present invention, the learning unit may be configured to learn when the own vehicle stops.

The state where the own vehicle stops is similar to the state where the vehicle occupant does not need to grip the steering wheel. In the above structure, by learning in the stopping state, the accuracy of the learning result is increased. As a result, the accuracy of the gripping determination is increased.

In the present invention, the grip determination unit may be configured to change the determination level of the grip sensor that is positioned in an area that is lower than a center of the steering wheel, in a manner that it becomes less easy to determine that the steering wheel is gripped and it becomes easier to determine that the steering wheel is not gripped, compared with the determination level of the grip sensor that is positioned in an area other than the area that is lower than the center of the steering wheel.

In the above structure, even if the abdomen or the thigh of the leg of the vehicle occupant is in contact with the lower part of the rim of the steering wheel in the gripping request, the wrong determination in which it is determined that the vehicle occupant grips the steering wheel becomes less likely to occur.

The grip sensor may be an electrostatic capacitance sensor, and the grip determination unit may be configured to use a voltage threshold of the electrostatic capacitance sensor as the determination level, corresponding to a criterion for determining whether the steering wheel is gripped or not gripped, and increase the voltage threshold so that it becomes less easy to determine that the steering wheel is gripped and it becomes easier to determine that the steering wheel is not gripped.

By the present invention, even if the vehicle occupant changes the posture and a part of the vehicle occupant other than the hand is in contact with the steering wheel in the automated driving, the wrong determination in which it is determined that the vehicle occupant grips the steering wheel becomes less likely to occur.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a vehicle control device according to the present invention will be described in detail with reference to the attached drawings.

1. Structure of Own Vehicle 10

Figure 1:
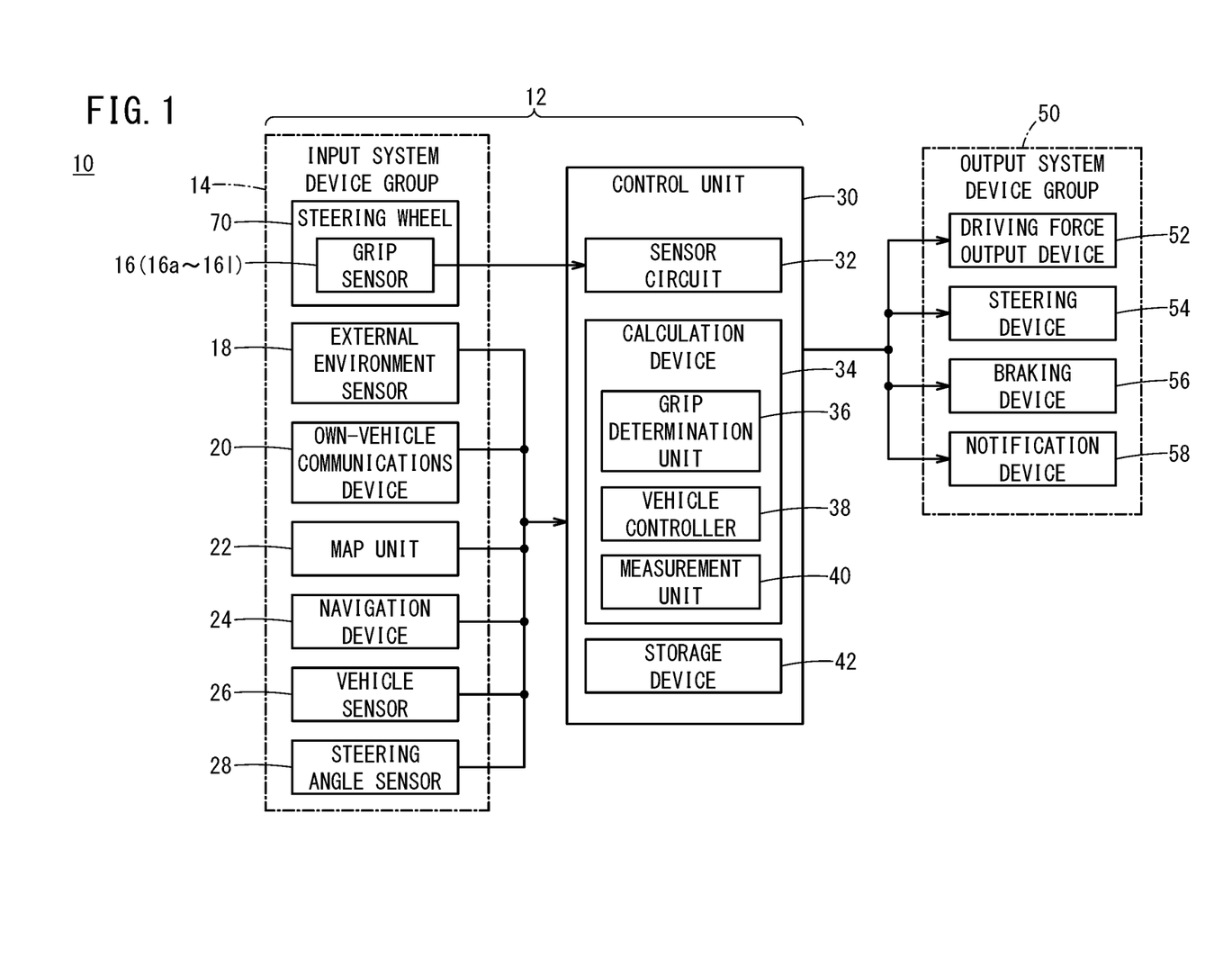
FIG. 1 is a structure diagram of a vehicle control device according to an embodiment.

As illustrated in FIG. 1, an own vehicle 10 includes an input system device group 14 that acquires or stores various kinds of information, a control unit 30 to which information output from the input system device group 14 is input, and an output system device group 50 that operates in accordance with various instructions output from the control unit 30. A vehicle control device 12 according to the present embodiment includes the input system device group 14 and the control unit 30.

The own vehicle 10 is an automated driving vehicle in which the control unit 30 can perform travel control. Specifically, the own vehicle 10 makes transitions among an automated driving state where the control unit 30 performs the entire driving operation, a semi-automated driving state where the control unit 30 performs a part of the driving operation, and a normal driving state where a vehicle occupant performs the driving operation. The automated driving state in the present embodiment is a state where gripping a steering wheel 70 is not needed, that is, a state where the vehicle control device 12 performs steering. The semi-automated driving state in the present embodiment is a state where the vehicle control device 12 assists the steering on the premise that the steering wheel 70 is gripped.

[1.1. Input System Device Group 14]

The input system device group 14 includes a grip sensor 16, an external environment sensor 18, an own-vehicle communications device 20, a map unit 22, a navigation device 24, vehicle sensors 26, and a steering angle sensor 28. The grip sensor 16 detects how the vehicle occupant grips the steering wheel 70. The grip sensor 16 will be described in [2]. The external environment sensor 18 detects a state of a periphery (external environment) of the own vehicle 10 and outputs the detected information to the control unit 30. The external environment sensor 18 includes a plurality of cameras, a plurality of radars, and one or more LIDARs. The own-vehicle communications device 20 performs communications with a communications device provided in another vehicle and/or an infrastructure such as a road to acquire external environment information including the other vehicle information and/or the road information, and outputs the external environment information to the control unit 30. The map unit 22 stores the number of lanes, the type of lane, the lane width, and the like, and outputs the stored information to the control unit 30. The navigation device 24 measures the position of the own vehicle 10 and sets a scheduled route from the position of the own vehicle 10 to a destination, and outputs the own-vehicle position information and the scheduled route information to the control unit 30. The vehicle sensors 26 detect a travel state of the own vehicle 10, and outputs the travel state information to the control unit 30. The vehicle sensors 26 include a vehicle speed sensor, an acceleration sensor, a yaw rate sensor, an inclination sensor, a travel distance sensor, and the like. The steering angle sensor 28 detects the turning angle of the steering wheel 70, and outputs the turning angle information to the control unit 30.

[1.2. Control Unit 30]

The control unit 30 is configured by an ECU, and includes a sensor circuit 32, a calculation device 34 such as a processor, and a storage device 42 such as a ROM and a RAM.

The sensor circuit 32 is electrically connected to the grip sensor 16. The sensor circuit 32 converts an electric signal (signal for electrostatic capacitance value C) that is output from the grip sensor 16 into a voltage value V. The sensor circuit 32 employs a known integration (for example, Japanese Laid-Open Patent Publication No. 2015-147531), a known charge transfer method, or the like.

The calculation device 34 achieves various functions by executing programs stored in the storage device 42. The calculation device 34 according to the present embodiment functions as a grip determination unit 36, a vehicle controller 38, and a measurement unit 40.

The grip determination unit 36 compares the voltage value V that is converted by the sensor circuit 32 and a voltage threshold Vth, and determines whether the vehicle occupant grips the steering wheel 70. In this specification, the voltage threshold Vth corresponding to a criterion to determine whether the steering wheel 70 is gripped or not gripped is referred to as a determination level. The grip determination unit 36 can change the voltage threshold Vth appropriately. As the voltage threshold Vth becomes larger, it becomes less easy to determine that the steering wheel 70 is gripped and it becomes easier to determine that the steering wheel 70 is not gripped. As the voltage threshold Vth becomes smaller, it becomes easier to determine that the steering wheel 70 is gripped and it becomes less easy to determine that the steering wheel 70 is not gripped. Note that the grip determination unit 36 uniformizes the determination level of each grip sensor 16 (16a to 16l) in a normal case, and changes the determination level of a part of the grip sensors 16 in a particular case (when gripping request is generated).

The vehicle controller 38 calculates an acceleration/deceleration instruction value and a steering instruction value on the basis of each piece of information that is output from the input system device group 14 in order to perform the driving operation of the own vehicle 10 partially or entirely. Then, the vehicle controller 38 outputs the acceleration/deceleration instruction value and the steering instruction value to a driving force output device 52, a steering device 54, and a braking device 56. In addition, if the steering wheel 70 needs to be gripped by the vehicle occupant, a notification instruction of the gripping request is output to a notification device 58.

The measurement unit 40 measures a travel distance of the own vehicle 10 or an elapsed time from a predetermined timing. The travel distance may be calculated by using the detection value from the vehicle speed sensor and the time, or may be calculated based on the detection value from the travel distance sensor.

The storage device 42 stores numerals such as thresholds (including a voltage threshold Vth) used in comparison, determination, or the like in each process, in addition to various programs to be executed by the calculation device 34.

[1.3. Output System Device Group 50]

The output system device group 50 includes the driving force output device 52, the steering device 54, the braking device 56, and the notification device 58. The driving force output device 52 includes a driving force output ECU, and a driving source such as an engine or a driving motor. The driving force output device 52 generates a driving force in accordance with a vehicle occupant's operation of an accelerator pedal or the acceleration instruction value that is output from the control unit 30. The steering device 54 includes an electric power steering system (EPS) ECU and an EPS actuator. The steering device 54 generates a steering force in accordance with a vehicle occupant's operation of the steering wheel 70 or the steering instruction value that is output from the control unit 30. The braking device 56 includes a braking ECU and a braking actuator. The braking device 56 generates a braking force in accordance with a vehicle occupant's operation of a braking pedal or the deceleration instruction value that is output from the control unit 30. The notification device 58 includes a notification ECU and an information transmission device (such as a display device, an acoustic device, or a tactile device). The notification device 58 notifies the vehicle occupant in accordance with the notification instruction that is output from the control unit 30 or another ECU.

2. Steering Wheel 70

Figure 2:
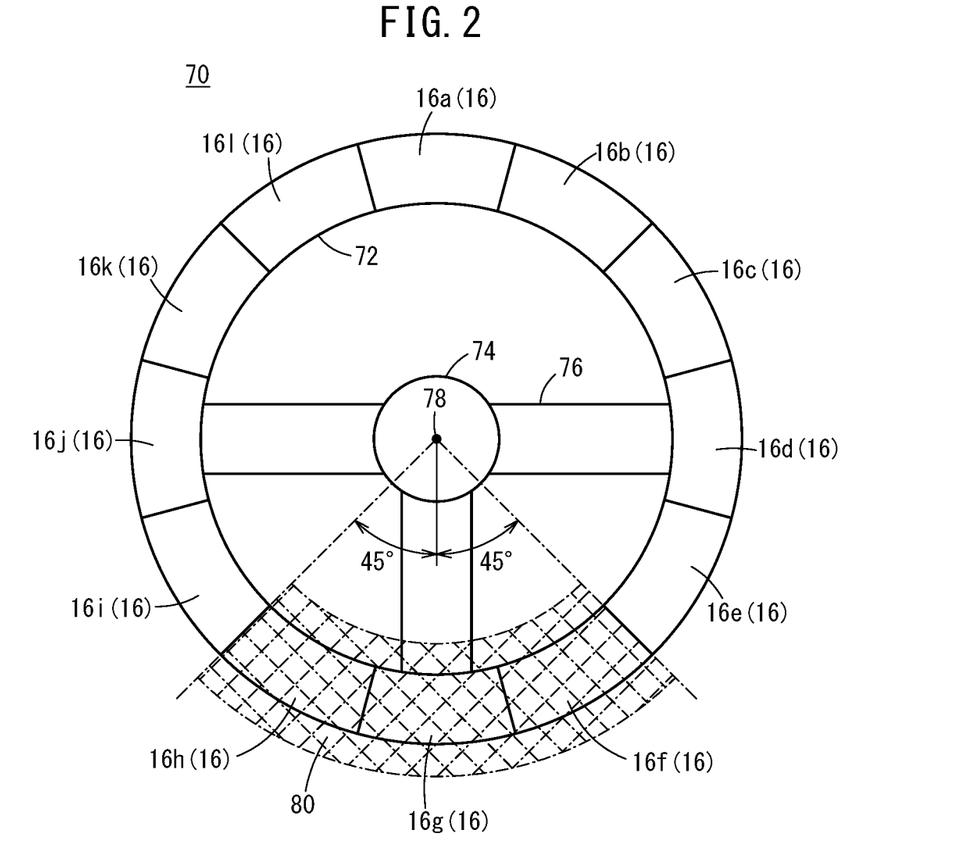
FIG. 2 illustrates an operation state (posture) of a steering wheel when an own vehicle travels straight.
Figure 3:
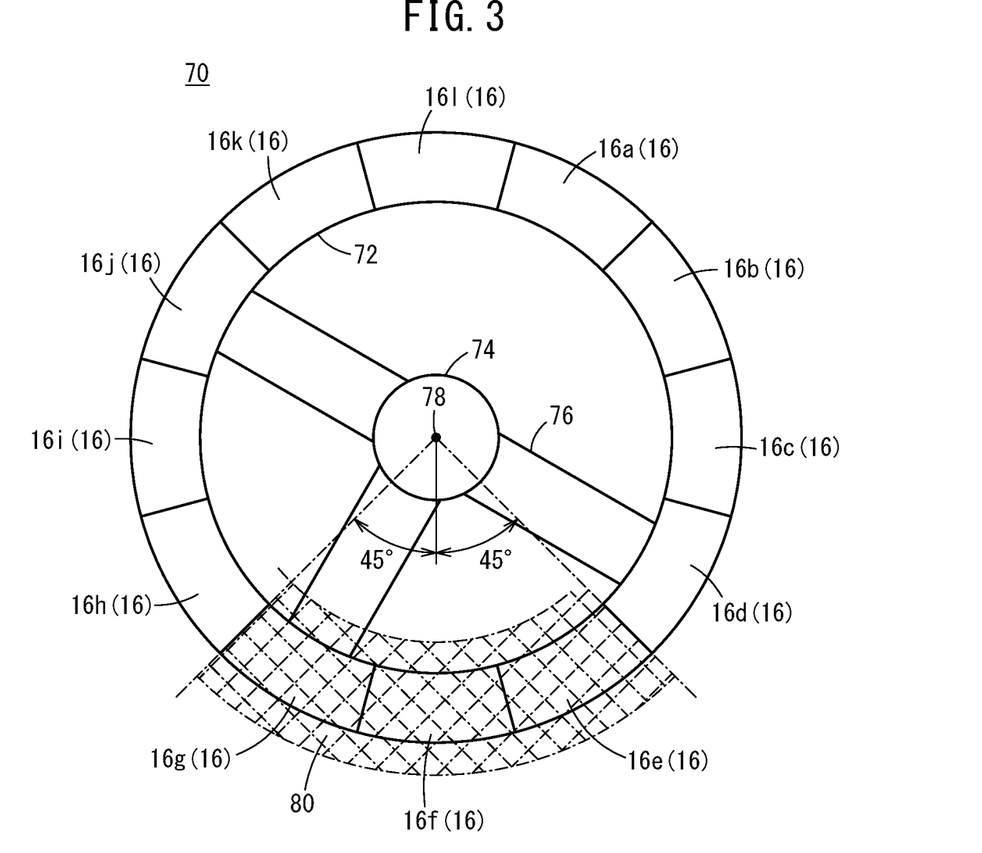
FIG. 3 illustrates the operation state of the steering wheel when the steering wheel is turned to a right direction by 30°.

FIG. 2 illustrates an operation state (posture) of the steering wheel 70 when the own vehicle 10 travels straight. FIG. 3 illustrates the operation state of the steering wheel 70 when the steering wheel 70 is turned to a right direction by 30°. Description will be given concerning a structure of the steering wheel 70 with reference to FIG. 2.

The steering wheel 70 includes a rim 72 with an annular shape, a hub 74 that is connected to a steering shaft (not shown), and spokes 76 that is present between the rim 72 and the hub 74.

The rim 72 has a laminated structure in which a cross section (the cross section cut by a plane including (and in parallel to) a central axis of the steering wheel 70) includes a plurality of layers. The rim 72 includes a core metal (not shown) corresponding to a skeleton, resin (not shown) that covers the entire core metal, the grip sensor 16 that covers the resin partially or entirely, and leather (not shown) that covers the grip sensor 16. FIG. 2 simply illustrates the steering wheel 70 without the leather for the convenience of description.

The grip sensor 16 is an electrostatic capacitance sensor provided along the rim 72. The electrostatic capacitance value C of the grip sensor 16 varies in accordance with an area with which the vehicle occupant is in contact. As the contact area becomes larger, the electrostatic capacitance value C becomes larger. The grip sensor 16 is connected to a power source that is not shown, and outputs the electric signal based on the electrostatic capacitance value C to the sensor circuit 32.

The grip sensor 16 is divided into a plurality of grip sensors along the rim 72. The grip sensor 16 in the FIG. 2 is divided into twelve. Each of the grip sensors 16a to 16l is connected to the sensor circuit 32. The adjacent grip sensors 16a to 16l are insulated from each other. It is preferable that the grip sensors 16a to 16l are provided along the rim 72 without any interspace.

3. Operation of Vehicle Control Device 12

Figure 4:
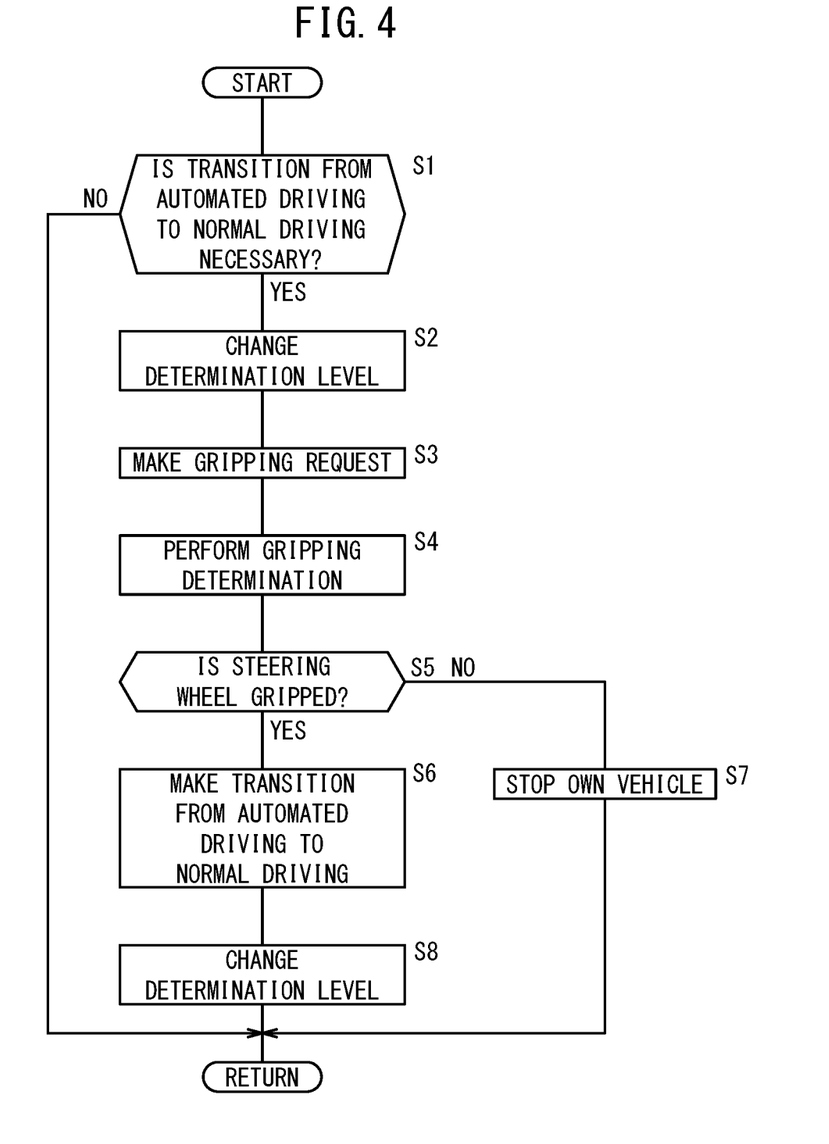
FIG. 4 is a flowchart of a process that is performed by the vehicle control device.

An operation of the vehicle control device 12 is described with reference to FIG. 4. The process in FIG. 4 is performed repeatedly while the vehicle controller 38 performs the entire driving operation of the own vehicle 10 at predetermined time intervals.

In steps S1, the vehicle controller 38 determines whether the transition from the automated driving to the normal driving is necessary. For example, if the vehicle controller 38 recognizes that the own vehicle 10 has approached an end point of an automated driving allowed section on the basis of the information from the navigation device 24 and the map unit 22, the vehicle controller 38 determines that the transition from the automated driving to the normal driving or the semi-automated driving is necessary. In addition, if it becomes difficult for the vehicle controller 38 to recognize the external environment state on the basis of the detected information from the external environment sensor 18, the vehicle controller 38 determines that the transition from the automated driving to the normal driving or the semi-automated driving is necessary. If the transition from the automated driving to the normal driving or the semi-automated driving is necessary (step S1: YES), the process advances to step S2. On the other hand, if the transition from the automated driving to the normal driving or the semi-automated driving is not necessary (step S1: NO), a series of processes is terminated once.

When the process has advanced from step S1 to step S2, the grip determination unit 36 changes the determination level of the grip sensors 16 that are positioned in a particular area 80 of disposed areas where the steering wheel 70 is disposed.

Here, as illustrated in FIG. 2 and FIG. 3, the particular area 80 is an area that is positioned in a particular direction from a center 78 of the steering wheel 70 as a reference position, that is, the area that is lower than the center 78 of the steering wheel 70 and that includes the rim 72. Specifically, on the premise that a position just under the center 78 in a radial direction corresponds to 0°, the particular area 80 is an area that is present between a position at 45° in the left side and a position at 45° in the right side in a circumferential direction of the steering wheel 70 and that includes the rim 72 (shaded part in FIG. 2 and FIG. 3). From a reference posture (FIG. 2) when the own vehicle 10 travels straight, the grip determination unit 36 recognizes the grip sensor 16 positioned in the particular area 80 on the basis of a steering angle φ that is detected by the steering angle sensor 28. For example, the steering angle φ is added to an angle range of θ1 to θ2 where each grip sensor 16 is positioned when the own vehicle 10 travels straight, and it is determined whether the grip sensor 16 is within the particular area 80 (+45° to −45°). Then, the determination level of the grip sensor 16 that is positioned in the particular area 80, that is, the voltage threshold Vth is set to a first voltage threshold Vth1. In FIG. 2, the grip sensor 16 that is positioned in the particular area 80 corresponds to the grip sensors 16f, 16g, 16h, and the grip sensors 16e, 16f, 16g in FIG. 3. Moreover, the determination level of the grip sensor 16 that is positioned in an area other than the particular area 80, that is, the voltage threshold Vth is set to a second voltage threshold Vth2 (normal value). In FIG. 2, the grip sensor 16 that is positioned in the area other than the particular area 80 corresponds to the grip sensors 16a, 16b, 16c, 16d, 16e, 16i, 16j, 16k, 16l, and the grip sensors 16a, 16b, 16c, 16d, 16h, 16i, 16j, 16k, 16l in FIG. 3. The first voltage threshold Vth1 is higher than the second voltage threshold Vth2. Thus, the grip determination unit 36 less easily determines that the steering wheel 70 is gripped on the basis of the detection result from the grip sensor 16 that is positioned in the particular area 80.

Note that if the grip sensor 16 is present over a border between the particular area 80 and the area other than the particular area 80, the grip determination unit 36 may determine that the grip sensor 16 is positioned in the particular area 80, or may determine that the grip sensor 16 is positioned in the area other than the particular area 80. Alternatively, the grip determination unit 36 may determine that the grip sensor 16 is positioned in the area including a center of the grip sensor 16 (the center in the circumferential direction of the steering wheel 70).

In step S3, the vehicle controller 38 outputs to the notification device 58, the notification instruction that instructs the notification device 58 to make a gripping request to the vehicle occupant. The notification device 58 makes the gripping request to the vehicle occupant in accordance with the notification instruction. For example, the notification device 58 displays the gripping request or outputs the gripping request by way of voice.

In step S4, the grip determination unit 36 performs the gripping determination. In this case, the sensor circuit 32 converts the electrostatic capacitance value C detected by each of the grip sensors 16a to 16l into the voltage value V. Then, the voltage value V of the grip sensor 16 that is positioned in the particular area 80 and the first voltage threshold Vth1 are compared. The grip sensor 16 that is positioned in the particular area 80 corresponds to the grip sensors 16f, 16g, 16h in FIG. 2, and the grip sensors 16e, 16f, 16g in FIG. 3. Moreover, the voltage value V of the grip sensor 16 that is positioned in the area other than the particular area 80 and the second voltage threshold Vth2 are compared. The grip sensor 16 that is positioned in the area other than the particular area 80 corresponds to the grip sensors 16a, 16b, 16c, 16d, 16e, 16i, 16j, 16k, 16l in FIG. 2, and the grip sensors 16a, 16b, 16c, 16d, 16h, 16i, 16j, 16k, 16l in FIG. 3.

If the grip sensor 16 has a voltage value V that is higher than or equal to the voltage threshold Vth (Vth1, Vth2), the grip determination unit 36 determines that the vehicle occupant grips the steering wheel 70 (step S5: YES), and the process advances to step S6. At this time, the measurement unit 40 starts to measure the time or the travel distance. On the other hand, if there is no grip sensor 16 whose voltage value V is higher than or equal to the voltage threshold Vth (Vth1, Vth2), the grip determination unit 36 determines that the vehicle occupant does not grip the steering wheel 70 (step S5: NO), and the process advances to step S7.

When the process has advanced from step S5 to step S6, the vehicle controller 38 makes the transition of the driving state of the own vehicle 10 from the automated driving state to the normal driving state or the semi-automated driving state.

When the process has advanced from step S5 to step S7, the vehicle controller 38 outputs to the braking device 56 and the steering device 54, the deceleration instruction value and the steering instruction value to pull over the own vehicle 10. Then, a series of processes is terminated.

When the process has advanced from step S6 to step S8, the grip determination unit 36 changes the determination level of the grip sensor 16 that is positioned in the particular area 80 when the measured value from the measurement unit 40 becomes a predetermined time or a predetermined distance. Here, the determination level is changed so that it becomes easier to determine that the steering wheel 70 is gripped, compared with the determination level after the change in step S2. For example, the grip determination unit 36 uniformizes the voltage threshold Vth of the grip sensor 16 that is positioned in the particular area 80 and the voltage threshold Vth of the grip sensor 16 that is positioned in the area other than the particular area 80. That is, the voltage threshold Vth is decreased from the first voltage threshold Vth1 to the second voltage threshold Vth2. Alternatively, the voltage threshold Vth may be decreased from the first voltage threshold Vth1 to a third voltage threshold Vth3 that is lower than the second voltage threshold Vth2. Thus, the grip determination unit 36 easily determines that the steering wheel 70 is gripped on the basis of the detection result from the grip sensor 16 that is positioned in the particular area 80.

4. Modifications

On the premise that the position just under the center 78 of the steering wheel 70 in the radial direction corresponds to 0°, the particular area 80 can be set in an area between a position at 60° in the left side and a position at 60° in the right side in the circumferential direction of the steering wheel 70. Moreover, the particular area 80 can be set not in the area under the center 78 of the steering wheel 70 in the radial direction, but in the other areas. For example, by learning the position that is gripped by the vehicle occupant, the particular area 80 can be set in reflection of the learning result.

Figure 5:
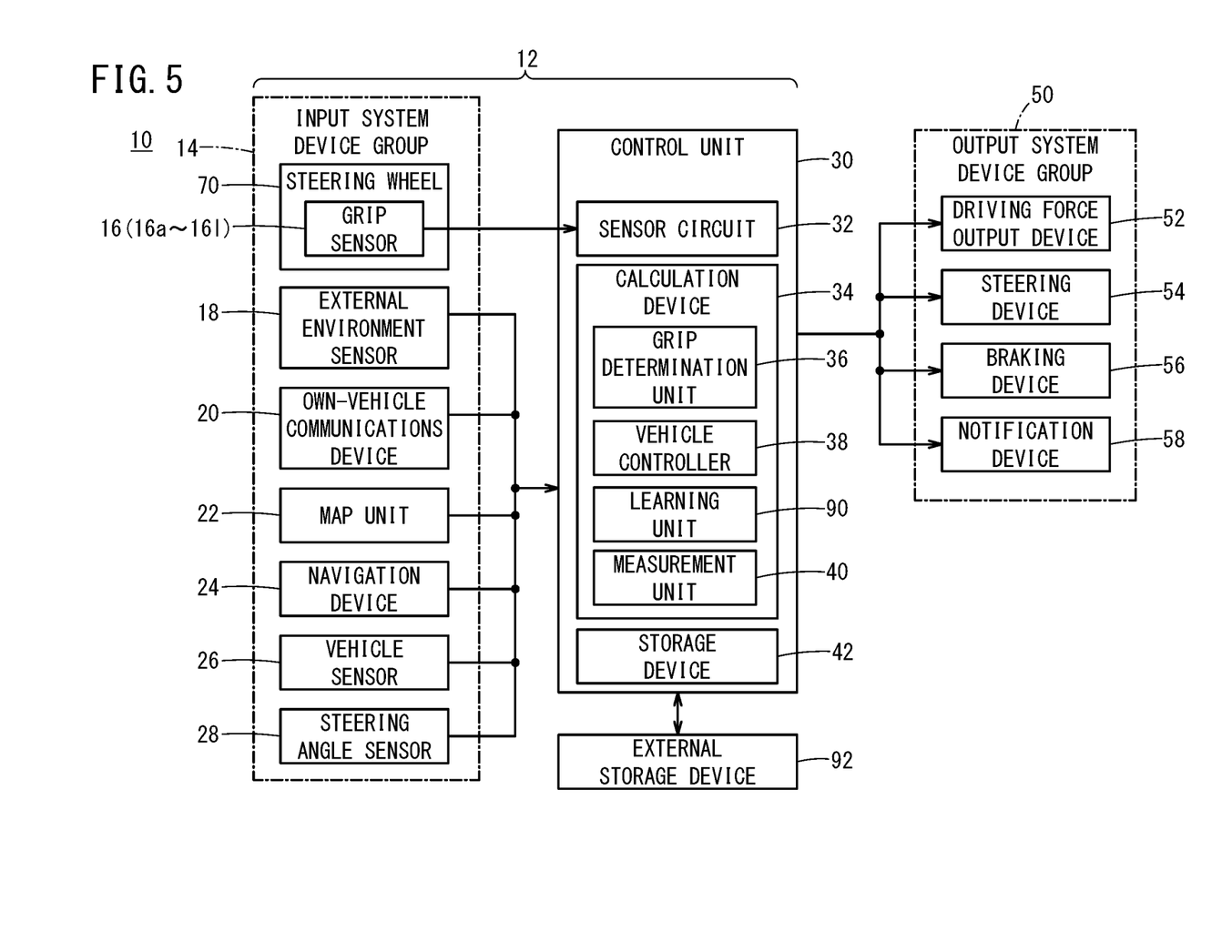
FIG. 5 is a structure diagram of a vehicle control device according to a modification.

In this case, as illustrated in FIG. 5, the calculation device 34 also functions as a learning unit 90. The learning unit 90 learns the position of the particular area 80 or the determination level of the grip sensor 16.

The learning unit 90 learns when the own vehicle 10 stops in the normal driving state or the semi-automated driving state where the vehicle occupant performs a steering operation. While the own vehicle 10 stops, the vehicle occupant may release the steering wheel 70. The posture in this case may be the same as the posture in the automated driving. That is to say, there is a possibility that the vehicle occupant does not grip the steering wheel 70 and a part of the vehicle occupant other than the hand is in contact with the steering wheel 70. At that time, the learning unit 90 causes an external storage device 92 to store the voltage value V that is converted by the sensor circuit 32 and the position of the grip sensor 16. This storing process is referred to as the "learning". If the elapsed time from the start of the learning becomes a predetermined time, or the travel distance of the own vehicle 10 from the start of the learning becomes a predetermined distance, the learning unit 90 reflects the learning result. For example, a position or an area where the most contacts are detected is regarded as the particular area 80. Moreover, the voltage values V that are calculated based on the grip sensor 16 positioned at the position or in the area are averaged, and the averaged value is regarded as the first voltage threshold Vth1, that is, the determination level. The learning unit 90 causes the storage device 42 to store the particular area 80 and the first voltage threshold Vth1. The grip determination unit 36 performs the gripping determination (step S4 in FIG. 4) by using the particular area 80 and the first voltage threshold Vth1.

The rim 72 of the steering wheel 70 as illustrated in FIG. 2 has the annular shape. However, the rim 72 may have a shape other than the annular shape. For example, instead of the rim 72 with the annular shape, grips that face each other using the hub 74 as a center may be provided.

The grip sensor 16 may be a pressure sensor instead of the electrostatic capacitance sensor. In this case, a pressure value P and a pressure threshold Pth are compared, and the pressure threshold Pth in the particular area 80 is set higher than the pressure threshold Pth in the area other than the particular area 80.

The grip sensor 16 may be one grip sensor without being divided into the plurality of grip sensors. In this case, the grip determination unit 36 needs to determine the contact position of the steering wheel 70 by the vehicle occupant in accordance with the electrostatic capacitance value C (voltage value V).

In the above embodiment, assuming that the center 78 of the steering wheel 70 is the reference position, the particular area 80 is the area that is positioned in the particular direction. Alternatively, the particular area 80 may be an area that is positioned at a particular height. For example, the particular area 80 may be an area that is positioned lower than an intermediate height of the steering wheel 70.

The size of the particular area 80 may be appropriately changed in accordance with a situation where the vehicle controller 38 determines that the transition from the automated driving to the normal driving is necessary. For example, when the steering wheel 70 rotates by the steering, the grip determination unit 36 may set the particular area 80 on the basis of the preceding rotation amount of the steering wheel 70. In addition, when the own vehicle 10 travels in a curved road, the grip determination unit 36 may narrow the particular area 80. Moreover, when the vehicle controller 38 causes the own vehicle 10 to avoid being in contact with the other vehicle, the grip determination unit 36 may narrow the particular area 80.

5. Summary of the Present Embodiment

The vehicle control device 12 includes: the grip sensor 16 provided along the steering wheel 70 and configured to detect a gripped state of the steering wheel 70 by the vehicle occupant; the grip determination unit 36 configured to determine whether the vehicle occupant grips the steering wheel 70 on the basis of the detection result from the grip sensor 16; and the vehicle controller 38 configured to make the gripping request if the transition from the state where the vehicle occupant in the own vehicle 10 does not need to grip the steering wheel 70 to the state where the vehicle occupant needs to grip the steering wheel 70 is performed. If the vehicle controller 38 makes the gripping request, the grip determination unit 36 is configured to change the determination level (voltage threshold Vth) of the grip sensor 16 that is positioned in the particular area 80 of the disposed area where the steering wheel 70 is disposed, in a manner that it becomes less easy to determine that the steering wheel 70 is gripped and it becomes easier to determine that the steering wheel 70 is not gripped, compared with the determination level (voltage threshold Vth) of the grip sensor 16 that is positioned in the area other than the area in the particular direction.

In the above structure, when the gripping request is made, the grip determination unit 36 is configured to change the determination level of the grip sensor 16 that is positioned in the particular area 80, for example the particular area 80 in the lower direction, of the disposed area where the steering wheel 70 is disposed, in a manner that it becomes less easy to determine that the steering wheel 70 is gripped and it becomes easier to determine that the steering wheel 70 is not gripped, compared with the determination level of the determination level of the grip sensor 16 that is positioned in the area other than the particular area 80. Thus, even if the vehicle occupant changes the posture and a part of the vehicle occupant other than the hand is in contact with the lower part of the steering wheel 70 during the automated driving, the wrong determination in which it is determined that the vehicle occupant grips the steering wheel 70 becomes less likely to occur.

The vehicle controller 38 is configured to control the own vehicle 10 in the first control state (semi-automated driving state and normal driving state) where the vehicle occupant needs to grip the steering wheel 70 and the second control state (automated driving state) where the vehicle occupant does not need to grip the steering wheel 70, and make the gripping request when the transition from the second control state to the first control state is performed. If the travel time of the own vehicle 10 becomes the predetermined time after the determination level is changed, or if the travel distance of the own vehicle 10 becomes the predetermined distance after the determination level is changed, the grip determination unit 36 is configured to change the determination level of the grip sensor 16 that is positioned in the particular area 80, in a manner that it becomes easier to determine that the steering wheel 70 is gripped and it becomes less easy to determine that the steering wheel 70 is not gripped.

In the above structure, the determination level of the grip sensor 16 that is positioned in the particular area 80 is further changed. Thus, in the first control state, the gripping determination of the vehicle occupant can be performed correctly.

If the travel time of the own vehicle 10 becomes the predetermined time after the determination level is changed, or if the travel distance of the own vehicle 10 becomes the predetermined distance after the determination level is changed, the grip determination unit 36 is configured to equalize the determination level of the grip sensor 16 that is positioned in the particular area 80, with the determination level of the grip sensor 16 that is positioned in the area other than the particular area 80.

In the above structure, the determination level of the grip sensor 16 that is positioned in the particular area 80 and the determination level of the grip sensor 16 that is positioned in the area other than the particular area 80 are equalized. Thus, the determination levels become uniform. Therefore, the determination result does not change depending on the gripping position of the vehicle occupant.

The own vehicle 10 is configured to make the transition between the automated driving state where the vehicle controller 38 performs the steering operation and the normal driving state where the vehicle occupant performs the steering operation. The vehicle control device 12 further includes the learning unit 90 configured to learn the position of the particular area 80, or the determination level of the grip sensor 16 during the automated driving.

In the above structure, by the learning, the particular area 80 or the determination level that suits the vehicle occupant can be set. Thus, the gripping determination can be performed more accurately.

The learning unit 90 is configured to learn when the own vehicle 10 stops. The state where the own vehicle 10 stops is similar to the state where the vehicle occupant does not need to grip the steering wheel 70. In the above structure, by learning in the stopping state, the accuracy of the learning result is increased. As a result, the accuracy of the gripping determination is increased.

The grip determination unit 36 is configured to change the determination level of the grip sensor 16 that is positioned in the particular area 80 that is lower than the center 78 of the steering wheel 70, in a manner that it becomes less easy to determine that the steering wheel 70 is gripped and it becomes easier to determine that the steering wheel 70 is not gripped, compared with the determination level of the grip sensor 16 that is positioned in the area other than the particular area 80 that is lower than the center 78 of the steering wheel 70.

In the above structure, even if the abdomen or the thigh of the leg of the vehicle occupant is in contact with the lower part of the rim 72 of the steering wheel 70 in the gripping request, the wrong determination in which it is determined that the vehicle occupant grips the steering wheel 70 becomes less likely to occur.

The grip sensor 16 is the electrostatic capacitance sensor, and the grip determination unit 36 is configured to use the voltage threshold Vth of the electrostatic capacitance sensor as the determination level, corresponding to the criterion for determining whether the steering wheel 70 is gripped or not gripped, and increase the voltage threshold Vth so that it becomes less easy to determine that the steering wheel 70 is gripped and it becomes easier to determine that the steering wheel 70 is not gripped.

The vehicle control device according to the present invention is not limited to the embodiment above, and can employ various structures without departing from the gist of the present invention.

What is claimed is:

1. A vehicle control device comprising:
    a plurality of grip sensors provided along a steering wheel and configured to detect a gripped state of the steering wheel by a vehicle occupant;
    a grip determination unit configured to determine whether the vehicle occupant grips the steering wheel on a basis of a detection result from one or more of the grip sensors; and
    a vehicle controller configured to make a gripping request if a transition from a state where the vehicle occupant in an own vehicle does not need to grip the steering wheel to a state where the vehicle occupant needs to grip the steering wheel is performed,
    wherein if the vehicle controller makes the gripping request, the grip determination unit is configured to change a determination level of the one or more grip sensors that are positioned in a particular area of a disposed area where the steering wheel is disposed, by increasing voltage thresholds of the one or more grip sensors that are positioned in the particular area, in a manner that the voltage thresholds of the one or more grip sensors that are in the particular area become higher than voltage thresholds of one or more of the grip sensors that are positioned in an area other than the particular area.

2. The vehicle control device according to claim 1, wherein:
   the vehicle controller is configured to control the own vehicle in a first control state where the vehicle occupant needs to grip the steering wheel and a second control state where the vehicle occupant does not need to grip the steering wheel, and make the gripping request when a transition from the second control state to the first control state is performed; and
   if a travel time of the own vehicle becomes a predetermined time after the determination level is changed, or if a travel distance of the own vehicle becomes a predetermined distance after the determination level is changed, the grip determination unit is configured to change the determination level of the one or more of the grip sensors that are positioned in the particular area, in a manner that the voltage thresholds of the one or more grip sensors that are in the particular area become higher than voltage thresholds of one or more of the grip sensors that are positioned in an area other than the particular area.

3. The vehicle control device according to claim 2, wherein if the travel time of the own vehicle becomes the predetermined time after the determination level is changed, or if the travel distance of the own vehicle becomes the predetermined distance after the determination level is changed, the grip determination unit is configured to equalize the determination level of the one or more grip sensors that are positioned in the particular area, with the determination level of the grip sensor that is positioned in the area other than the particular area.

4. The vehicle control device according to claim 1, wherein: the own vehicle is configured to make a transition between an automated driving state where the vehicle controller performs a steering operation and a normal driving state where the vehicle occupant performs the steering operation; and the vehicle control device further comprises a learning unit configured to learn a position of the particular area, or the determination level of the one or more grip sensors during the automated driving.

5. The vehicle control device according to claim 4, wherein the learning unit is configured to learn when the own vehicle stops.

6. The vehicle control device according to claim 1, wherein the grip determination unit is configured to change the determination level of the one or more grip sensors that are positioned in an area that is lower than a center of the steering wheel, by increasing voltage thresholds of the one or more grip sensors that are positioned in the particular area, in a manner that the voltage thresholds of the one or more grip sensors that are in the particular area become higher than voltage thresholds of the one or more grip sensors that are positioned in an area other than the area that is lower than the center of the steering wheel.

7. The vehicle control device according to claim 1, wherein:
   the one or more grip sensor are an electrostatic capacitance sensor; and
   the grip determination unit is configured to use a voltage threshold of the electrostatic capacitance sensor as the determination level, corresponding to a criterion for determining whether the steering wheel is gripped or not gripped, and increase the voltage thresholds of the one or more grip sensors that are positioned in the particular area, in a manner that the voltage thresholds of the one or more grip sensors that are in the particular area become higher than voltage thresholds of one or more of the grip sensors that are positioned in an area other than the particular area.

* * * * *